No. 668,499. Patented Feb. 19, 1901.
W. J. DALTON & R. T. WELSH.
TOOL FOR CLAMPING AND STRETCHING WIRES.
(Application filed May 18, 1900.)

(No Model.)

Witnesses
F. L. Ourand
Geo. M. Copenhaver

Inventors
Wm. J. Dalton and
Richard T. Welsh.
Geo. H. Evans
Attorney

UNITED STATES PATENT OFFICE.

WILLIAM J. DALTON AND RICHARD T. WELSH, OF MERIDIAN, MISSISSIPPI.

TOOL FOR CLAMPING AND STRETCHING WIRES.

SPECIFICATION forming part of Letters Patent No. 668,499, dated February 19, 1901.

Application filed May 18, 1900. Serial No. 17,124. (No model.)

*To all whom it may concern:*

Be it known that we, WILLIAM J. DALTON and RICHARD T. WELSH, citizens of the United States, and residents of Meridian, Lauderdale county, Mississippi, have invented certain new and useful Improvements in Tools for Clamping and Stretching Wires, of which the following is a specification.

Our invention relates to that class of tools used in stretching and clamping wire, and is particularly adapted for electric-wire linemen.

The object of the invention is to provide a tool which may be employed to stretch a single wire or which may be employed in clamping the ends of two oppositely-strained wires during the operation of stretching and splicing. These objects we accomplish by the construction shown in the accompanying drawings, in which—

Figure 1:
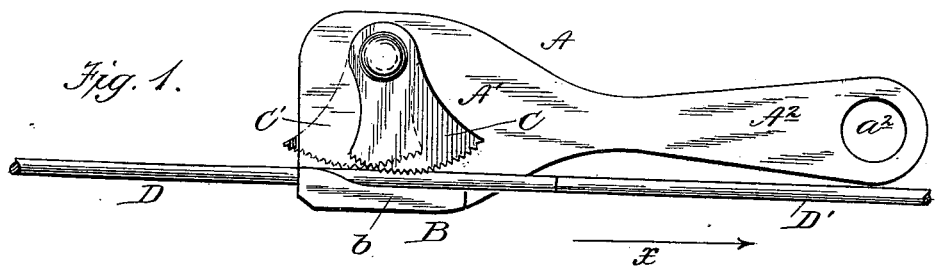
Figure 2:
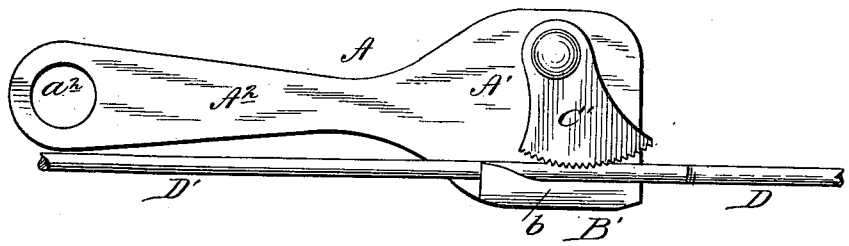
Figure 3:
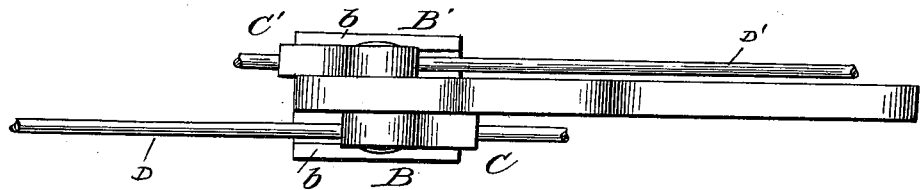
Figure 4:
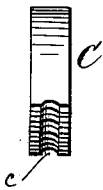

Figure 1 is a side elevation of our improved tool. Fig. 2 is a similar view of the opposite side, the two ends of the wires being engaged by said tool. Fig. 3 is a plan of the tool, and Fig. 4 is an end elevation of one of the clamping-jaws.

A is the body of the tool, comprising a head $A'$ and a handle portion $A^2$, having a transverse aperture $a^2$ through its end. From the lower edge of the head $A'$ project two fixed jaws B $B'$, one at each side, and the opposite ends of these jaws are provided with upturned lips $b\ b$, parallel with the sides of the head, so as to form the outer walls of two wire-receiving channels.

A transverse pivot extends through the upper portion of the head $A'$, and on the opposite ends of this pivot are mounted the swinging clamping-jaws C $C'$. The lower edges of these jaws C $C'$ are curved eccentric to the pivot or formed as cams, and the jaws work oppositely one to the other. The lower oppositely-arranged cam edges of the jaws C $C'$ are transversely corrugated or toothed, so as to bite on the wire, and they are also slightly grooved, as at $c$, so as to partially embrace the wires.

The jaw C is arranged with its point of greatest eccentricity toward the handle, so as to clamp the wire D when the handle is pulled in the direction of the arrow X or the said wire pulled in a direction opposite thereto, and the jaw $C'$ has its point of greatest eccentricity next to the outer edge of the head, so that it will clamp a wire $D'$ against an opposite strain.

The hole $a^2$ is for the purpose of inserting a rope or connecting device for drawing the wires together. The greater the force exerted the firmer the jaws will clamp the wires. Any suitable metals may be employed for the various parts, but good conducting material is the best, since the tool may then be used in taking the slack out of electric wires without breaking the current, which is of great importance in telegraphic and electric-light circuits.

With our clamp a single wire may be pulled and stretched by engaging it with the jaws B C and pulling on the handle. The other jaws are used in repairing line-wires and pulling slack wires.

The ends of a wire which has been cut to take up slack will be passed in opposite directions between the respective pairs of jaws B C and $B'$ $C'$ and pulled taut, which will cause both movable jaws or cams to bite down on the wires and hold them. While the wires are slack the tool may be moved rapidly back and forth lengthwise of the wires until a certain amount of slack is taken up, and as both sides of the tool are open the wires may be inserted laterally and the tool readily removed after the wires have been joined at one side of the tool. If they are not taut enough, the usual blocks may be secured to the wires beyond our tool and the blocks drawn together in the usual manner. This will cause the wires to slide in opposite directions through the clamping-jaws until the strain on the blocks is released, and then the tendency of the wires to pull apart will cause both jaws C $C'$ to bite down on them and hold them firmly while their ends are being secured together.

Having thus described our invention, what we claim, and desire to secure by Letters Patent, is—

1. A tool for stretching and clamping wires, consisting in a body provided with jaws projecting from its opposite outer sides, and two independent clamping-jaws also on the opposite outer sides of said body and movable in opposite directions to coöperate with the first-named jaws and clamp two wires under opposite strain, substantially as described.

2. A tool for stretching and clamping wires, consisting in a body provided with stationary jaws at opposite sides, and freely-swinging jaws pivoted to opposite sides of the said body above the stationary jaws, and having oppositely-arranged eccentric lower edges to clamp two oppositely-strained wires; substantially as described.

3. A wire stretching and clamping tool, comprising a handle terminating in a head having stationary jaws at opposite sides of its lower edge, and the oppositely-operating pivoted cam-like clamping-jaws to hold oppositely-strained wires; substantially as described.

4. A wire stretching and clamping tool, comprising a transversely-apertured handle terminating in a head having stationary jaws at opposite sides of its lower edge provided with upwardly-extending lips and the freely-swinging clamping cams or jaws having grooved and toothed lower edges; substantially as described.

In testimony whereof we affix our signatures in presence of two witnesses.

WILLIAM J. DALTON.
RICHARD T. WELSH.

Witnesses:
F. E. GRESSETT,
ALBERT CHAFFIN.